(12) United States Patent
Li

(10) Patent No.: US 12,345,895 B1
(45) Date of Patent: Jul. 1, 2025

(54) VIRTUAL REALITY (VR) STRAP SYSTEM AND VR APPARATUS

(71) Applicant: Yanmei Li, Yongzhou (CN)

(72) Inventor: Yanmei Li, Yongzhou (CN)

( * ) Notice: Subject to any disclaimer, the term of this patent is extended or adjusted under 35 U.S.C. 154(b) by 0 days.

(21) Appl. No.: 18/656,676

(22) Filed: May 7, 2024

(51) Int. Cl.
*G02B 27/01* (2006.01)

(52) U.S. Cl.
CPC .............................. *G02B 27/0176* (2013.01)

(58) Field of Classification Search
CPC ................. A42B 7/00; G02B 27/0176; G02B 2027/0154; G06F 1/163; G06F 1/1688; H02G 11/02; H04R 1/1008; H04R 1/1033; H04R 1/1041; H04R 1/105; H04R 1/1058; H04R 1/1016; H04R 2499/15; H04R 5/0335
See application file for complete search history.

(56) References Cited

U.S. PATENT DOCUMENTS

| | | | | |
|---|---|---|---|---|
| 2021/0325681 | A1* | 10/2021 | Yoshida | G02B 27/0176 |
| 2024/0028074 | A1* | 1/2024 | Gu | H04R 1/105 |
| 2025/0036201 | A1* | 1/2025 | Zimmerman | H04N 23/56 |

* cited by examiner

*Primary Examiner* — Nelson M Rosario
(74) *Attorney, Agent, or Firm* — Daniel M. Cohn

(57) ABSTRACT

A virtual reality (VR) strap system and a VR apparatus are provided. The VR strap system includes a strap assembly and a rear pillow assembly. The strap assembly is configured to connect to VR glasses, the strap assembly includes a main housing body, and the main housing body includes at least two limiting portions disposed at intervals in a height direction thereof. The rear pillow assembly is configured to be in contact with a rear portion of a human head, the rear pillow assembly includes at least one mounting component and at least one connecting block, the at least one mounting component is connected to the at least one connecting block, a positioning portion is disposed on the at least one connecting block. The positioning portion is capable of respectively matching and fixing with each of the at least two limiting portions.

17 Claims, 12 Drawing Sheets

VIRTUAL REALITY (VR) STRAP SYSTEM AND VR APPARATUS

TECHNICAL FIELD

The present disclosure relates to a technical field of virtual reality (VR) apparatuses, and in particular to a VR strap system and a VR apparatus.

BACKGROUND

Nowadays, virtual reality (VR) technology increasingly develops, application scenarios of which are also broaden, such as filed of games, viewing, real estate, etc. However, different users have different head circumferences, such differences may affect comfort and experience of users of any gender, age, or race when the users use VR headsets.

Moreover, current VR headsets are poor in adaptability, the users may hardly fine-tune straps thereof, and requirements of quickly loosening or tightening the straps may not be satisfied.

SUMMARY

Embodiments of the present disclosure provides a virtual reality (VR) strap system and a VR apparatus, which adjusts a height of a strap assembly with respect to a rear pillow assembly to enable VR glasses to better fit a head structure of a user, so that pressure and discomfort on a head of the user are reduced, thereby improving wearing comfort of the VR glasses.

In a first aspect, the embodiments of the present disclosure provide the VR strap system, including the strap assembly and the rear pillow assembly. The strap assembly is configured to connect to the VR glasses, the strap assembly includes a main housing body, and the main housing body includes at least two limiting portions disposed at intervals in a height direction thereof. The rear pillow assembly is configured to be in contact with a rear portion of a human head, the rear pillow assembly includes at least one mounting component and at least one connecting block, the at least one mounting component is connected to the at least one connecting block, a positioning portion is disposed on the at least one connecting block. The positioning portion is capable of respectively matching and fixing with each of the at least two limiting portions, so as to adjust a height of the strap assembly with respect to the rear pillow assembly.

In one embodiment, an accommodating cavity is defined in the main housing body, an outer surface of the main housing body is recessed toward the accommodating cavity to form at least one sliding groove, the at least two limiting portions are disposed on a bottom wall of the at least one sliding groove. The at least one connecting block is slidably disposed in the at least one sliding groove, the positioning portion is disposed at one end of the at least one connecting block away from the at least one mounting component.

In one embodiment, the at least one connecting block includes a connecting section and a limiting section, the connecting section is perpendicular to the limiting section, the at least one mounting component is disposed at one end of the connecting section away from the limiting section, and the at least one positioning portion is disposed on an end surface of the limiting section away from the connecting section; along the height direction, the at least one sliding groove includes fixing portions disposed at two sides thereof, the fixing portions extend toward a middle of the at least one sliding groove to form a sliding space; in an extending direction of the main housing body, a size of the sliding space is not larger than a size of the limiting section and not smaller than a size of the connecting section; when the sliding section slides in the sliding space, the limiting section is disposed within the at least one sliding groove and abuts against an inner side surface of each of the fixing portions.

In one embodiment, a mounting port communicated with the sliding space is defined on one end of the at least one sliding groove; in the extending direction of the main housing body, a side of the mounting port is not smaller than the size of the connecting section.

In one embodiment, two limiting holes are defined on the bottom wall of the at least one sliding groove at intervals in the extending direction of the main housing body, and a supporting portion is disposed on the bottom wall of the at least one sliding groove. The at least two limiting portions are disposed on the supporting portion.

In one embodiment, the rear pillow assembly further includes a rear pillow cushion, the rear pillow cushion is connected to the mounting component and is configured to be in contact with the rear portion of the human head. The VR strap system further includes a pillow strap, the pillow strap is connected to the rear pillow assembly and is configured to be in contact with a top portion of the human head.

In one embodiment, the main housing body includes a connecting shaft in the accommodating cavity. The strap assembly includes an adjustable strap and a tightness adjustment mechanism. First engaging teeth are disposed on one end of the adjustable strap, and a free end of the adjustable strap extends out of one end of the main housing body. The tightness adjustment mechanism is disposed in the accommodating cavity. The tightness adjustment mechanism includes a driving gear, an adjustment gear, a one-way clutch, an adjustment knob. The driving gear is rotatably connected to the connecting shaft, the driving gear includes a first driving portion and second engaging teeth, the first driving portion and the second engaging teeth are disposed at intervals in a vertical direction, and the second engaging teeth are engaged with the first engaging teeth. The adjustment gear is coaxially and rotatably connected to the driving gear, the adjustment gear includes a first matching portion and a second matching portion, the first matching portion is connected to the second matching portion, the first matching portion is in transmission connection with the first driving portion, The adjustment gear is slidably disposed in the vertical direction, and the adjustment gear has a first working position and a second working position. The one-way clutch is connected to the main housing body, and at least one pawl is disposed on the one-way clutch. The adjustment knob includes a mounting portion and a knob portion, the knob portion is connected to an outer side of the mounting portion; the mounting portion is coaxially and rotatably connected to the adjustment gear, the mounting portion includes a second driving portion in transmission connection with the second matching portion, the mounting portion further include ratchet teeth engaged with the at least one pawl. The knob portion partially extends out of the main housing body. When the adjustment gear is in the first working position, the second matching portion is matched and connected with the second driving portion; when the adjustment gear is in the second working position, the second matching portion is separated from the second driving portion and is out of limitation of the second driving portion.

In one embodiment, a bearing portion protrudes outward from a middle of the driving gear, the bearing portion is disposed between the first driving portion and the second engaging teeth. The tightness adjustment mechanism further includes a first elastic component, two ends of the first elastic component respectively abut against the bearing portion and the adjustment gear.

In one embodiment, a groove is defined on the bearing portion, one end of the first elastic component abuts against a groove bottom wall and a groove side wall of the groove.

In one embodiment, the VR strap system further includes a button and a second elastic component. The button is connected to the main housing body in a snap-fit manner, and the button partially extends out of the main housing body. Two ends of the second elastic component respectively abut against the main housing body and the button. The button is slidably disposed in the vertical direction, so that the adjustment gear is switched between the first working position and the second working position.

In one embodiment, the button includes a pressing portion, at least one hook, and at least one pressing block. The at least one hook and the at least one pressing block are disposed on one side of the pressing portion facing the second elastic component. At least one through hole is defined on the main housing body, at least one clamping hole for matching with the at least one hook is further defined on the main housing body, the at least one pressing block passes through the at least one through hole.

In one embodiment, the mounting portion includes at least one limiting groove matching with the at least one hook. When the button slides in the vertical direction, the at least one hook is at least partially positioned in the at least one limiting groove.

In one embodiment, a mounting groove is recessed inward from an outer wall surface of the main housing body, the button is partially disposed in the mounting groove, an outer surface of the button and the outer wall surface of the main housing body are in the same smooth transition surface.

In one embodiment, the one-way clutch includes a main body portion, the main body portion is annularly disposed on an outer side of the driving gear, at least one deformation gap is defined between the at least one pawl and the main body portion, and the bearing portion is overlapped on the main body portion.

In one embodiment, the first driving portion includes flanges disposed on an outer wall surface of the driving gear.

In one embodiment, the adjustment gear is annularly disposed on an outer side of the driving gear, the first matching portion includes notches defined on an inner wall surface of the adjustment gear.

In one embodiment, the second matching portion is a first limiting gear disposed on an outer wall surface of the adjustment gear, the second driving portion is a second limiting gear disposed on an inner wall surface of the mounting portion, and the first limiting gear is clamped with the second limiting gear.

In one embodiment, a guide portion is disposed at a bottom end of the first limiting gear and/or a top end of the second limiting gear.

In a second aspect, the present disclosure provides the VR apparatus, including VR glasses and the VR strap system as foregoing. Two opposite sides of the VR glasses are respectively connected to two free ends of the strap assembly.

According to the VR strap system of the present disclosure, the main housing body includes the at least two limiting portions disposed at intervals in the height direction thereof, the positioning portion disposed on the at least one connecting block is capable of respectively matching and fixing with each of the at least two limiting portions, so as to adjust the height of the strap assembly with respect to the rear pillow assembly. Since the two free ends of the strap assembly are fixedly connected to the VR glasses, the height of the strap assembly of the present disclosure is adjusted with respect to the rear pillow assembly, that is, the VR glasses are capable of adjusting a wearing position with respect to the rear pillow assembly, in this way, the VR glasses better fit the head structure of the user through adjusting the height of the strap assembly with respect to the rear pillow assembly, so that the pressure and the discomfort on the head of the user are reduced, thereby improving the wearing comfort of the VR glasses. Therefore, the user is enabled to enjoy virtual reality experience for a longer time without discomfort, and the user may adjust the wearing position of the VR glasses according to actual needs and comfort experience, so as to obtain a more personalized wearing experience.

BRIEF DESCRIPTION OF DRAWINGS

In order to more clearly illustrate embodiments of the present disclosure or technical solutions in the prior art, accompanying drawings required in the embodiments or the prior art are briefly introduced below, and obviously, the accompanying drawings in following description are merely some embodiments of the present disclosure, and for those who skilled in the art, other drawings may also be obtained according to structures shown in the accompanying drawings without creative efforts.

Figure 1:
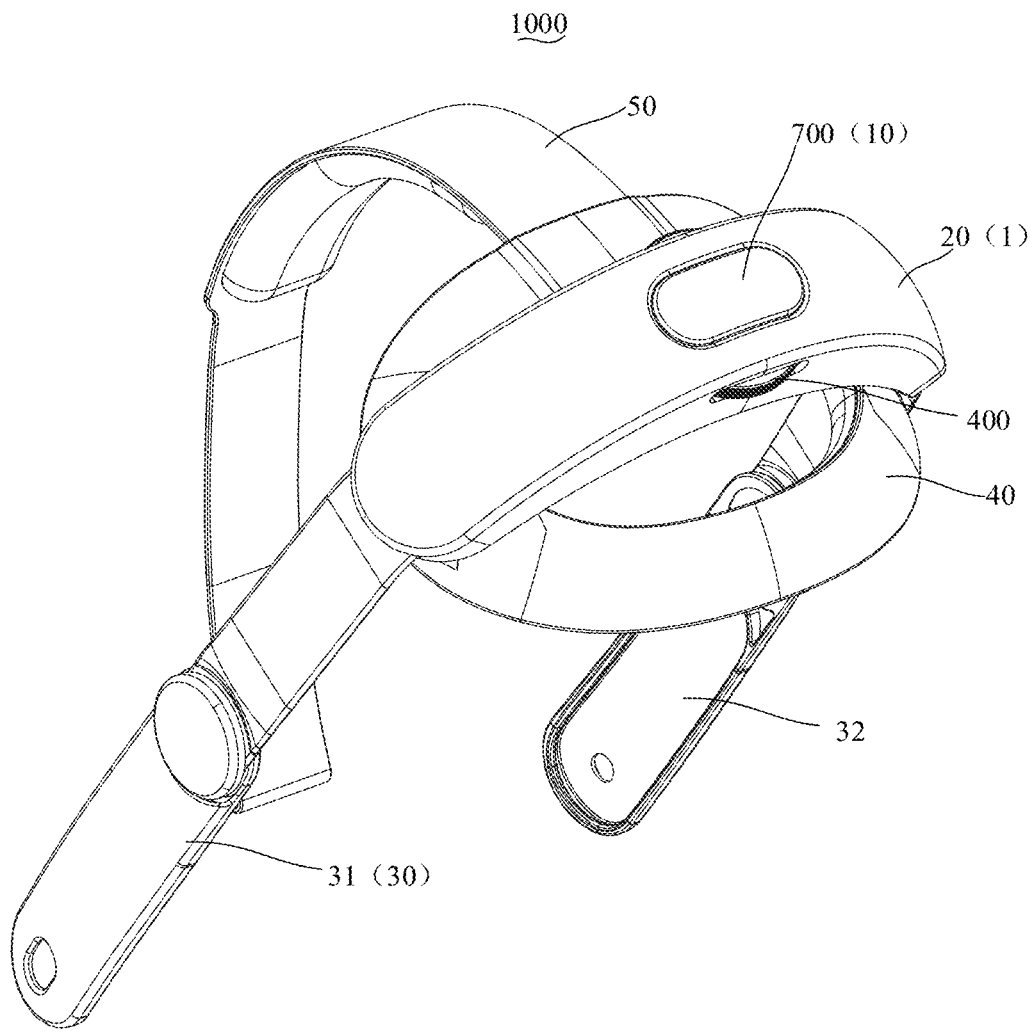
FIG. 1 is a structural schematic diagram of a VR strap system represented in a first viewing angle according to one embodiment of the present disclosure.

Reference numerals in the drawings: 1000. VR strap system VR; 1. strap assembly; 10. tightness adjustment mechanism; 100. driving gear; 110. first driving portion; 111. flange; 120. second engaging tooth; 130. bearing portion; 131. groove; 200. adjustment gear; 210. first matching portion; 211. notch; 220. second matching portion; 300. one-way clutch; 310. main body portion; 320. pawl; 400. adjustment knob; 410. mounting portion; 411. limiting groove; 420. knob portion; 430. second driving portion; 431. guide portion; 440. ratchet teeth; 500. first elastic component; 600. second elastic component; 700. button; 710. pressing portion; 711. hook; 712. pressing block; 20. main housing body; 21. accommodating cavity; 22. connecting shaft; 23a. through hole; 23b. clamping hole; 24a. first limiting opening; 24b. second limiting opening; 25. first housing; 26. second housing; 27. mounting groove; 28. sliding groove; 281. limiting portion; 282. fixing portion; 283. limiting hole; 284. supporting portion; 30. adjustable strap; 31. first strap; 32. second strap; 33. first engaging tooth; 40. rear pillow assembly; 41. mounting component; 42. connecting block; 421. positioning portion; 422. connecting section; 423. limiting section; 43. rear pillow cushion; 50. pillow strap.

Implementations, functional characteristics, and advantages of the present disclosure are further described with reference to the accompanying drawings in combination with the embodiments

DETAILED DESCRIPTION OF EMBODIMENTS

In order to better understand technical solutions of the present disclosure, embodiments of the present disclosure are described in detail below with reference to accompanying drawings.

When following description refers to the accompanying drawings, unless otherwise indicated, the same numbers in different drawings represent the same or similar elements. Implementations described in following exemplary embodiments do not represent all implementations consistent with this application. Instead, they are merely examples of apparatuses and methods consistent with some aspects of the present disclosure as recited in appended claims.

In the description of the present disclosure, it should be understood that terms "first", "second", etc. are only used for descriptive purposes, and cannot be understood as indicating or implying relative importance. Those who skilled in the art would understand specific meanings of the foregoing terms in the present disclosure according to specific situations. In addition, in the description of the present disclosure, unless otherwise stated, "a plurality of" means two or more, "and/or" used herein is merely an association relationship describing associated objects. For example, A and/or B may indicate three cases that A exists alone, A and B exist, and B exists alone, and a character "/" in the specification generally indicates an "or" relationship between the associated objects Unless otherwise defined, all technical and scientific terms used herein have the same meaning as commonly understood by those who skilled in the art to which the present disclosure belongs. The terms used in the specification are only for the purpose of describing specific embodiments, and are not intended to limit the present disclosure. As used herein, the term "and/or" includes any and all combinations of one or more of associated listed items.

Figure 2:
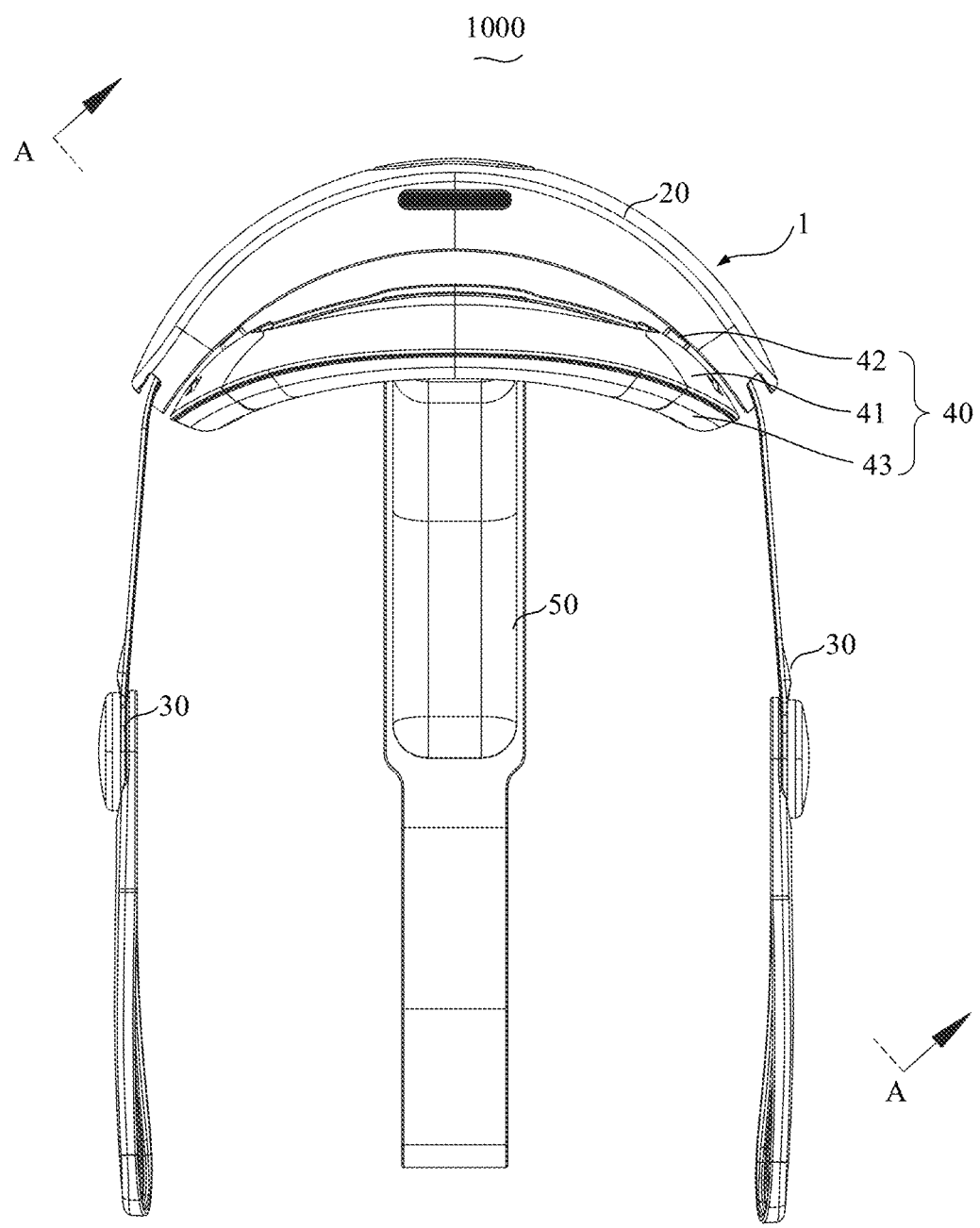
FIG. 2 is a structural schematic diagram of the VR strap system represented in a second viewing angle according to one embodiment of the present disclosure.
Figure 3:
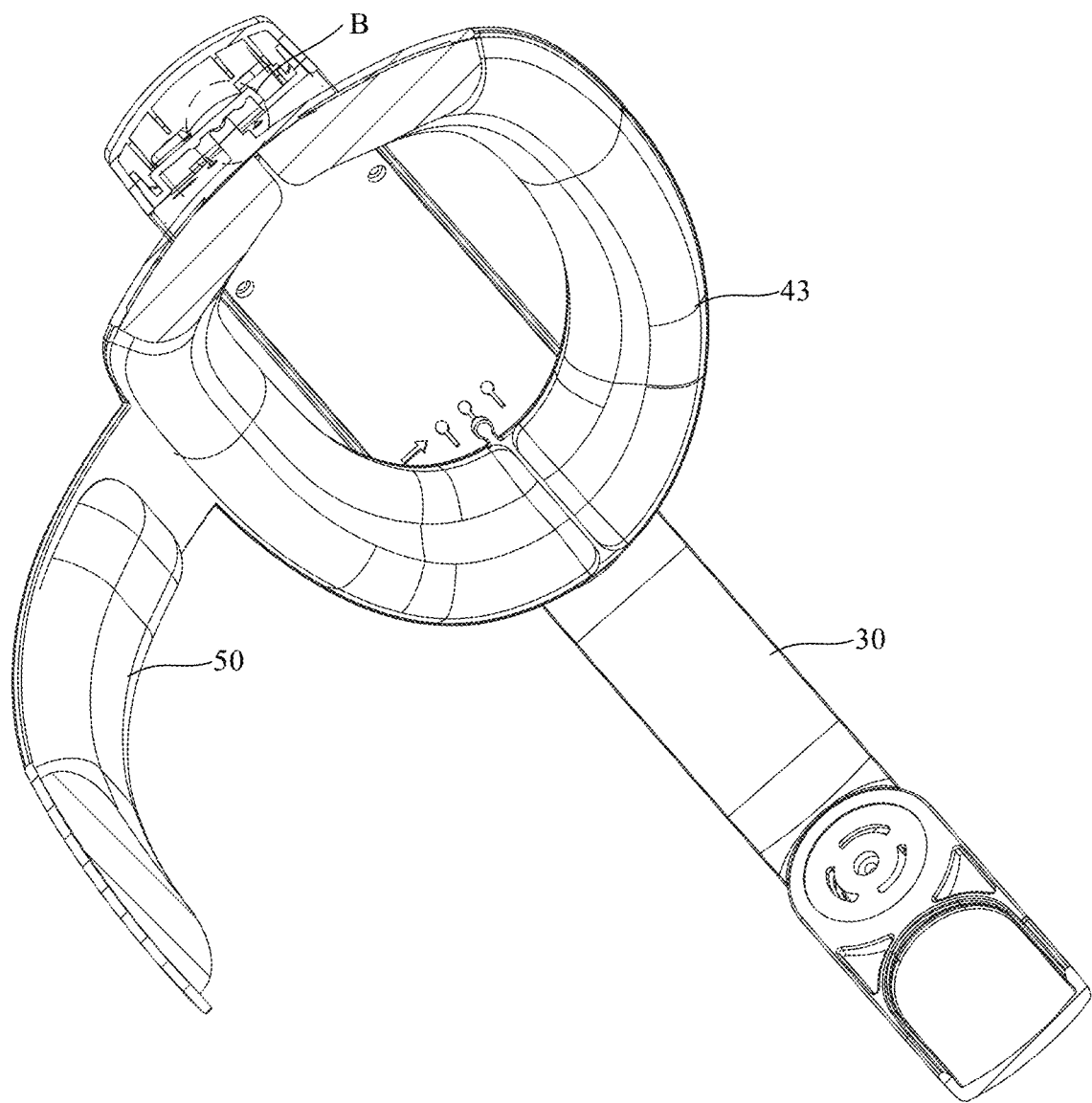
FIG. 3 is a cross-sectional schematic diagram taken along the line A-A shown in FIG. 2.
Figure 4:
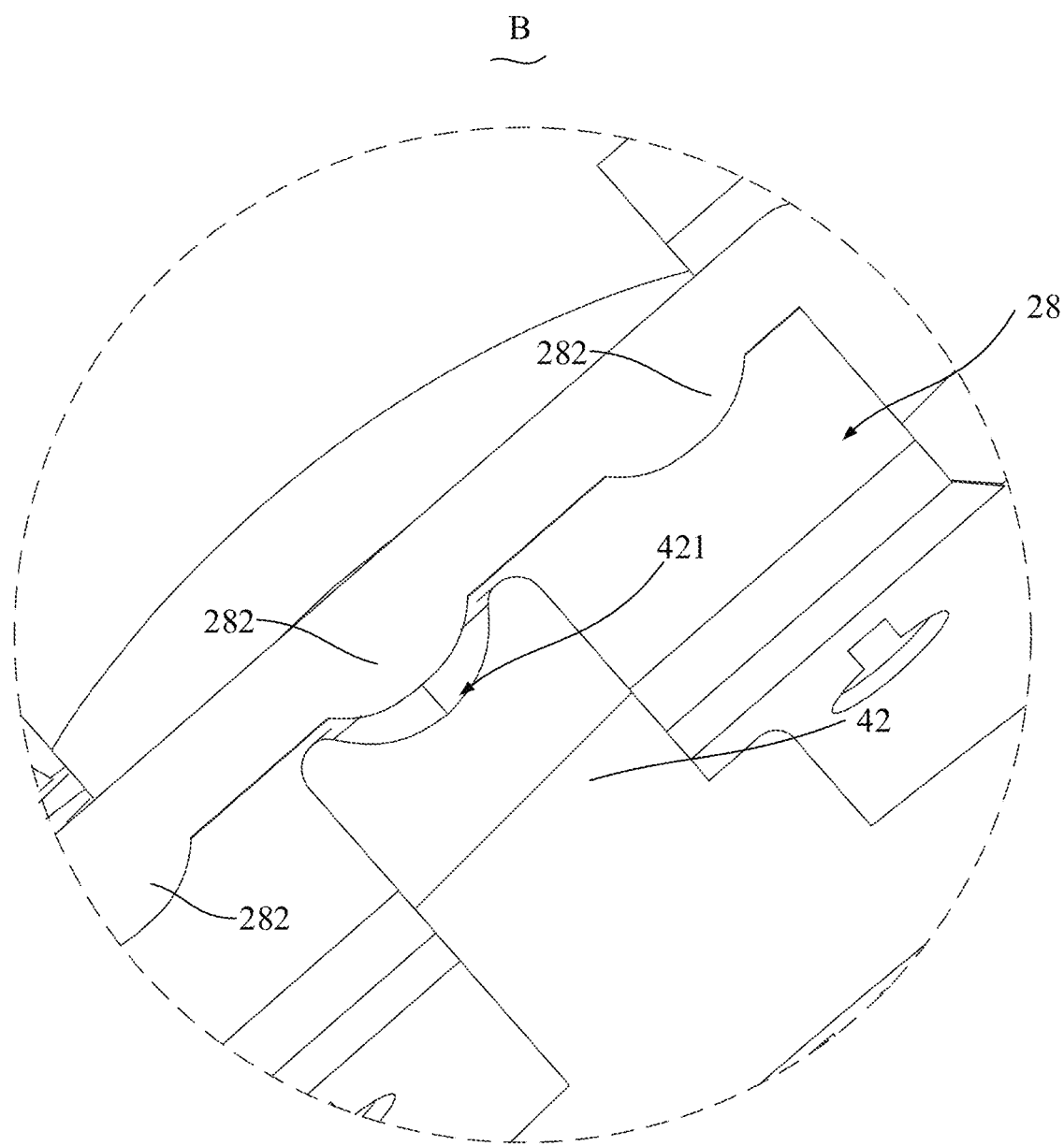
FIG. 4 is a partial enlarged schematic diagram of portion B shown in FIG. 3.
Figure 5:
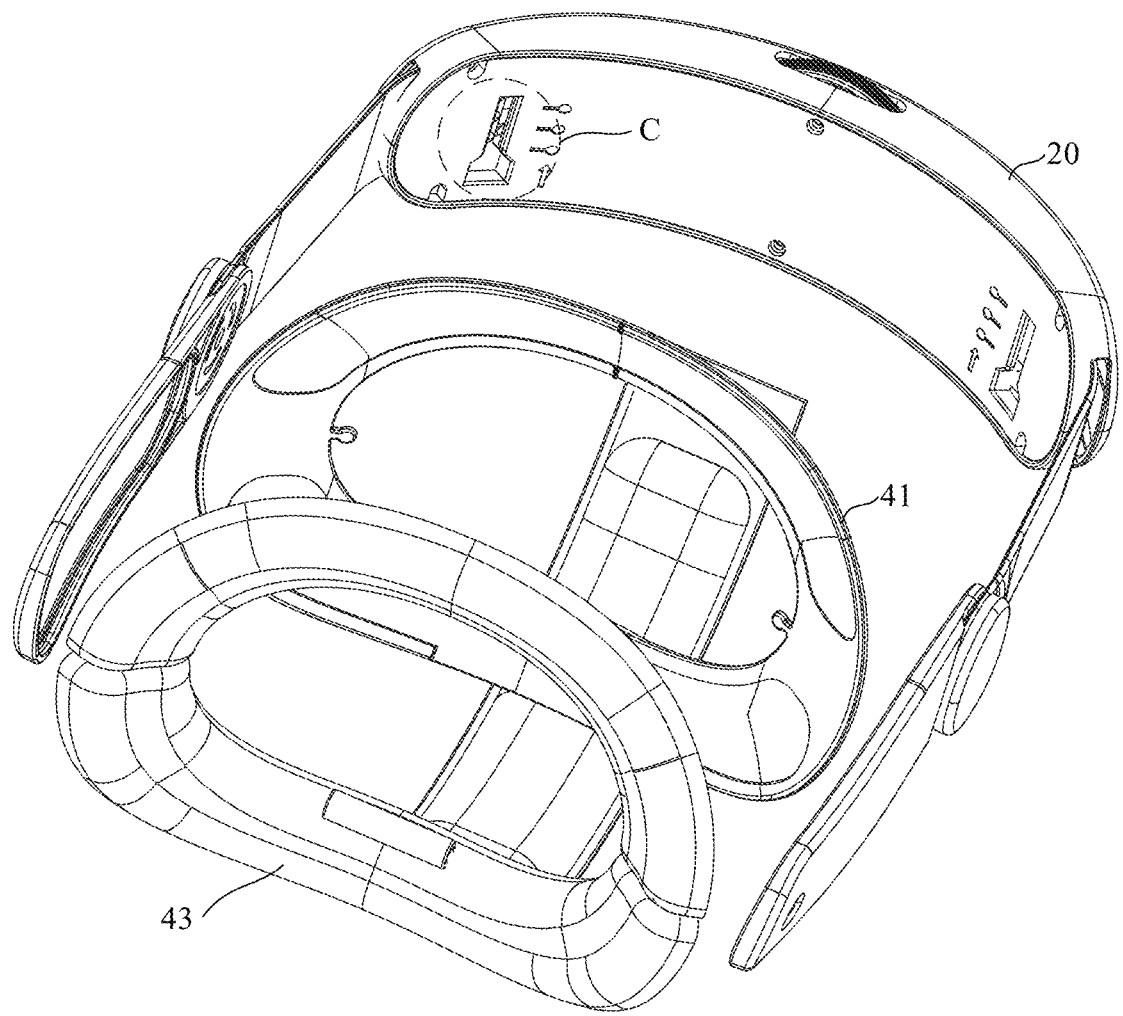
FIG. 5 is an exploded schematic diagram of the VR strap system according to one embodiment of the present disclosure.
Figure 6:
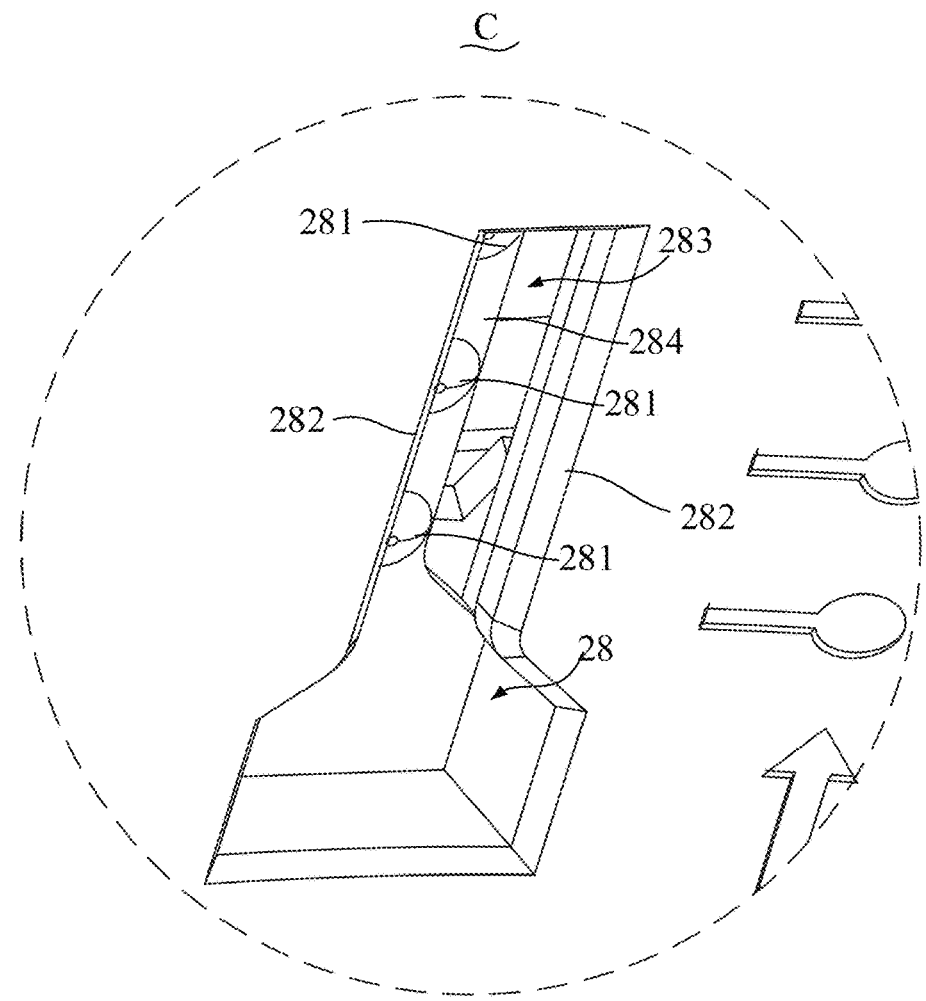
FIG. 6 is a partial enlarged schematic diagram of portion C shown in FIG. 5.

Please refer to FIGS. 1-2, the embodiments of the present disclosure provide a virtual reality (VR) strap system 1000 and a VR apparatus. The VR apparatus includes VR glasses (not shown in the drawings) and the VR strap system 1000.

Please refer to FIGS. 1-2, the VR strap system 1000 includes a strap assembly 1 and a rear pillow assembly 40. The strap assembly 1 is configured to connect to VR glasses, and the rear pillow assembly 40 is configured to be in contact with a rear portion of a human head. When wearing the VR glasses, a user aligns the pair of the VR glasses to his/her eyes and adjusts the strap assembly 1 to firmly abut the rear pillow assembly 40 against a rear portion of his/her head, so that comfort and firmness of wearing the VR glasses are improved.

Figure 8:
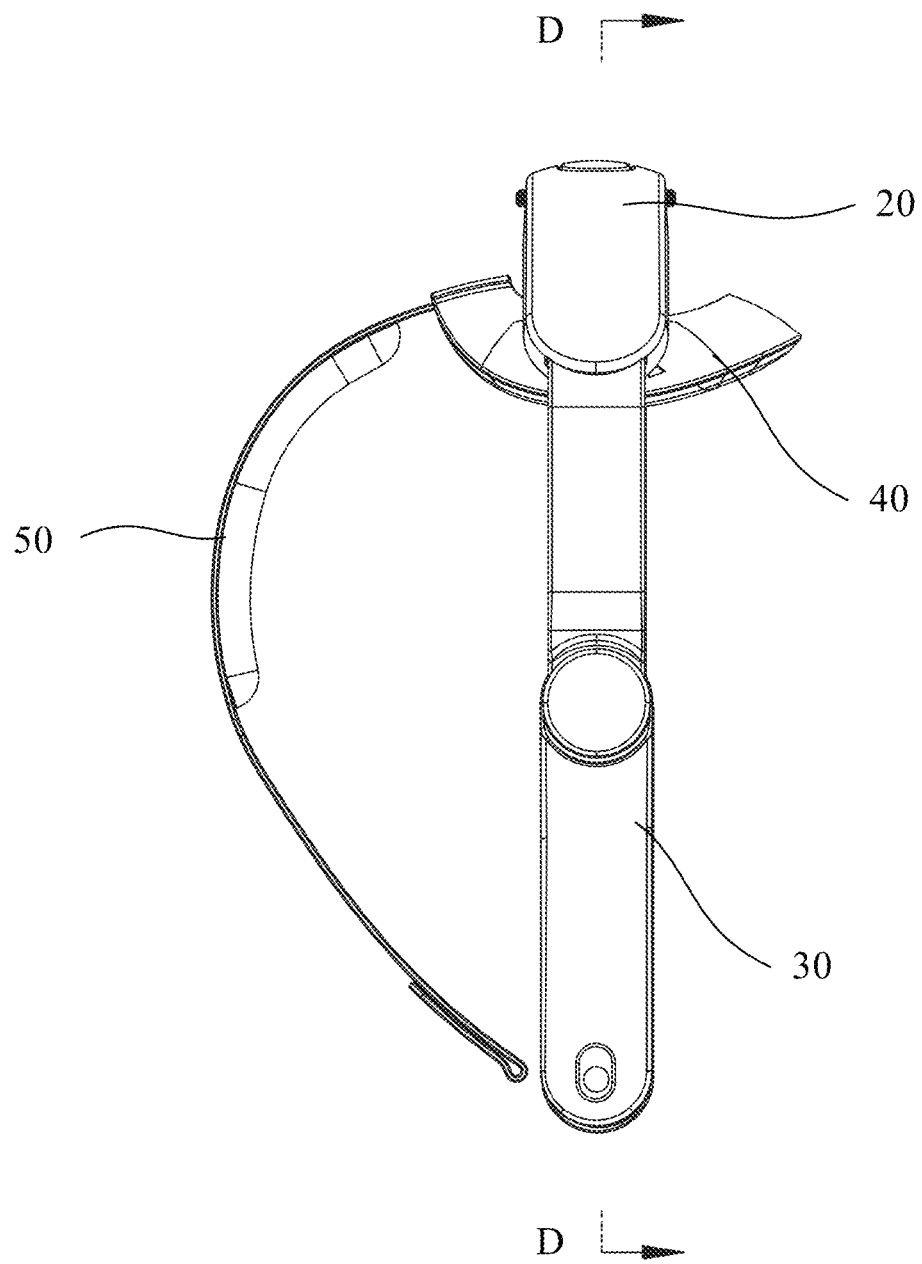
FIG. 8 is a structural schematic diagram of the VR strap system represented in a third viewing angle according to one embodiment of the present disclosure.
Figure 9:
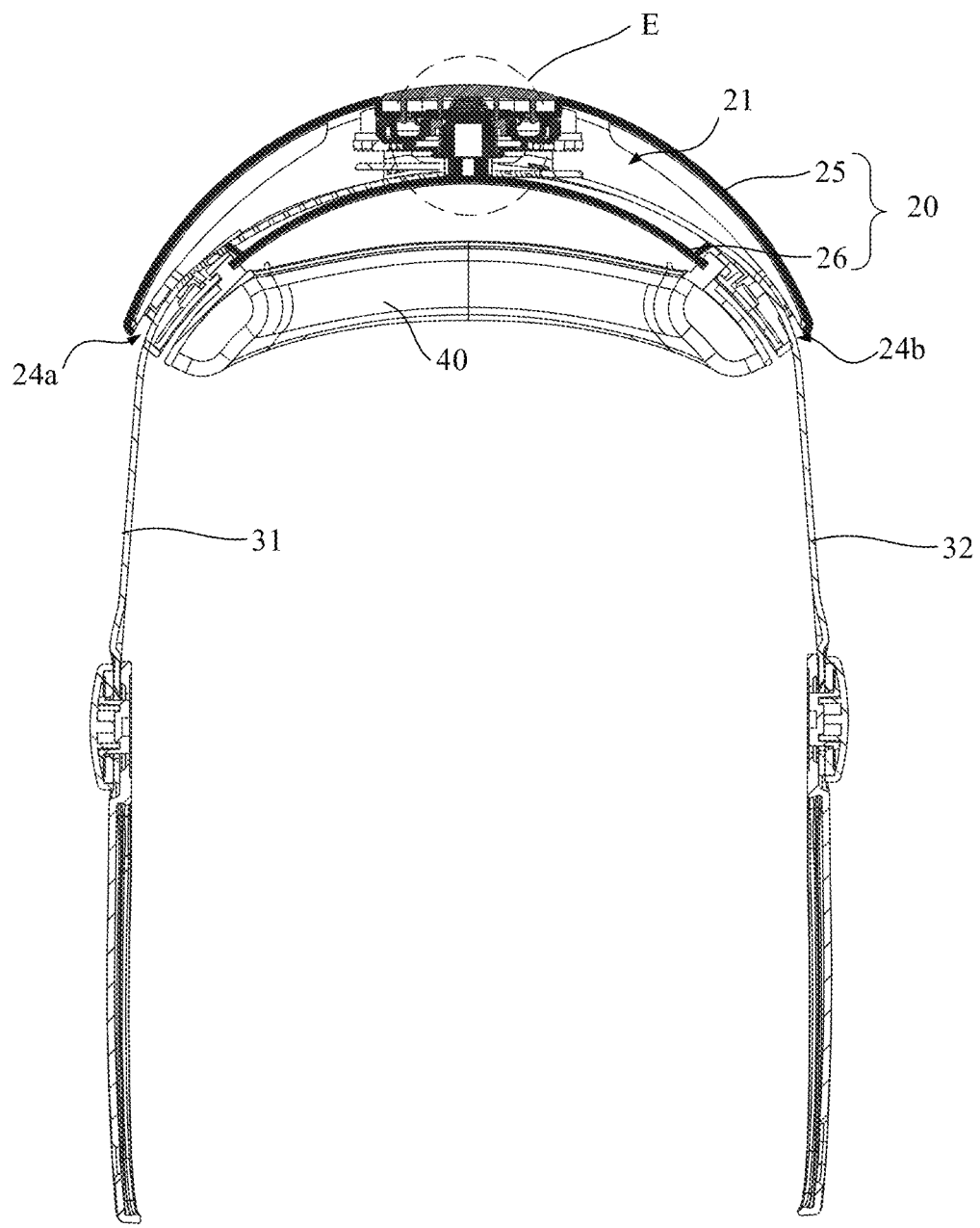
FIG. 9 is a cross-sectional schematic diagram taken along the line D-D shown in FIG. 8.
Figure 10:
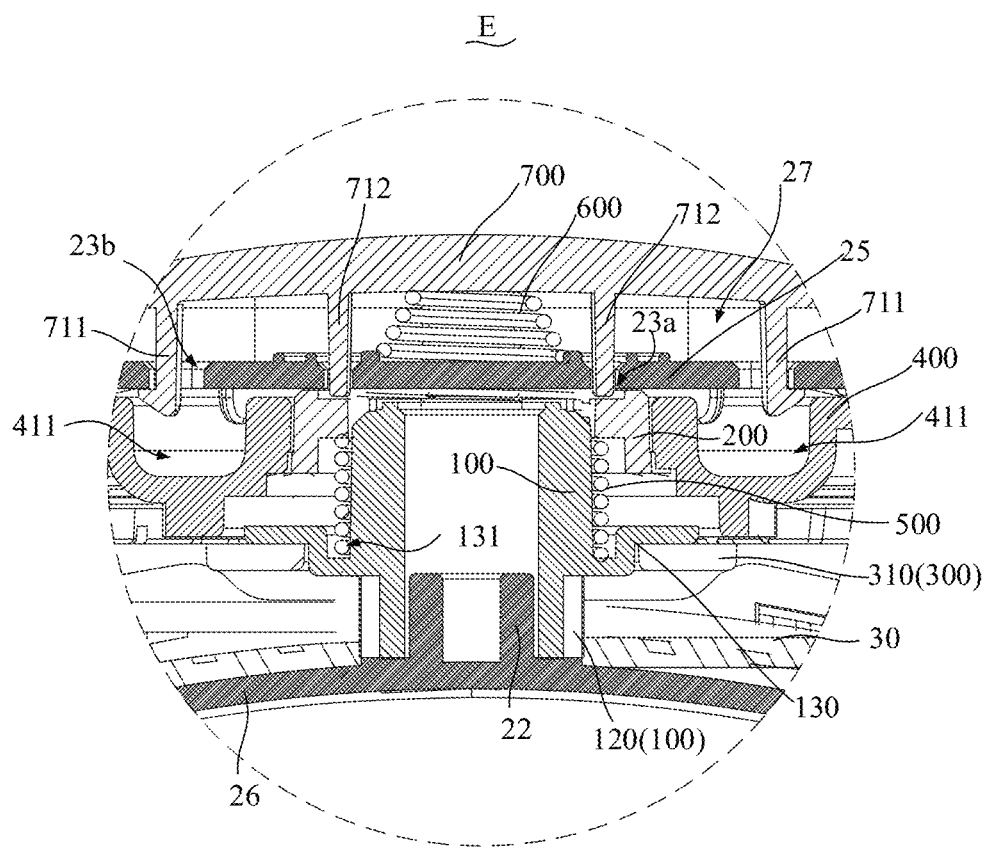
FIG. 10 is a partial enlarged schematic diagram of portion E shown in FIG. 9.
Figure 11:
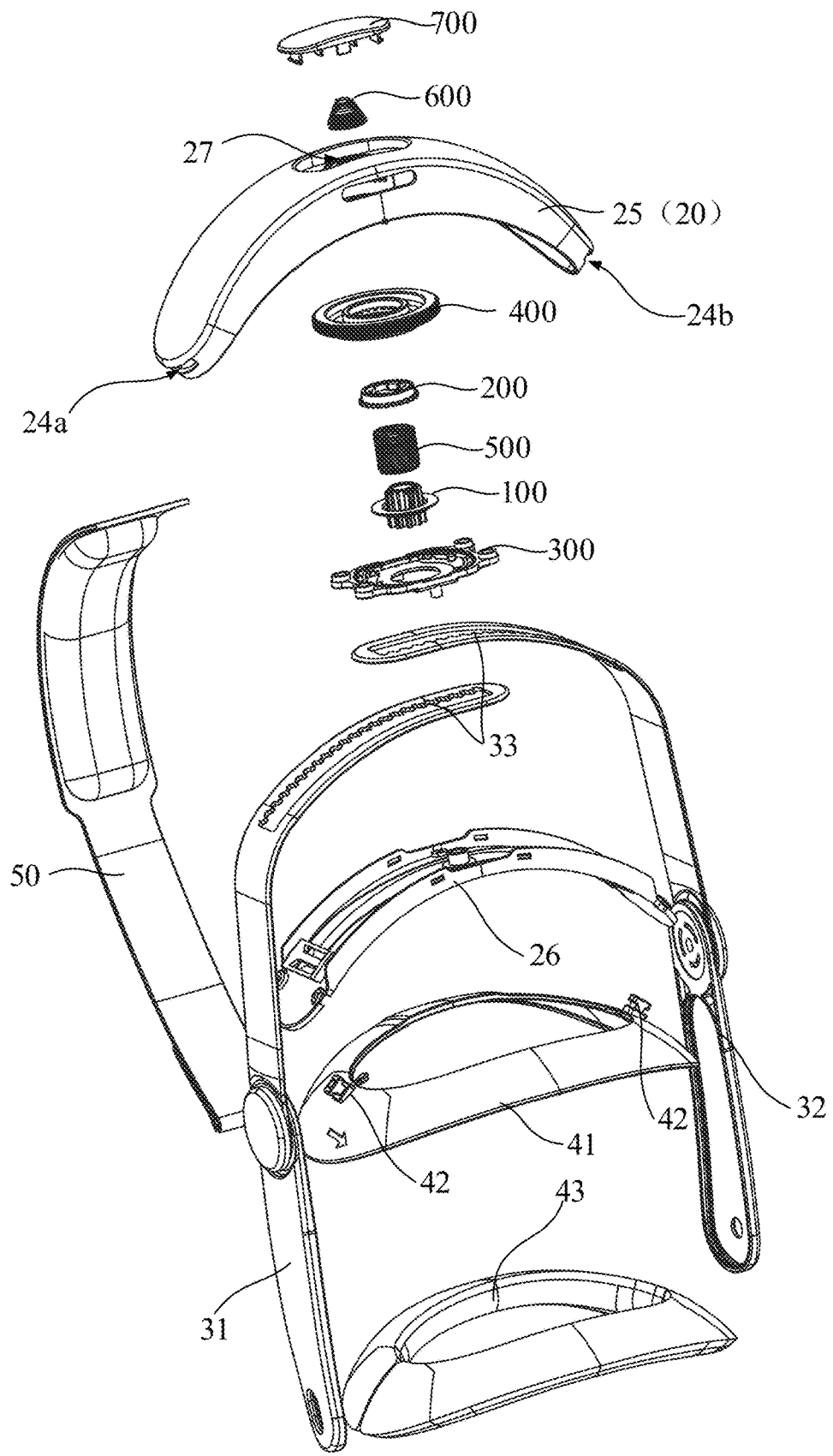
FIG. 11 is an exploded schematic diagram of the VR strap system according to one embodiment of the present disclosure.

Please refer to FIGS. 8-10, the VR strap system 1000 includes a main housing body 20, an adjustable strap 30, and a tightness adjustment mechanism 10.

Please refer to FIG. 9, an accommodating cavity 21 is defined in the main housing body 20, a first limiting opening 24a and a second limiting opening 24b are respectively defined on two opposite sides of the main housing body 20, the first limiting opening 24a and the second limiting opening 24b are communicated with the accommodating cavity 21. The tightness adjustment mechanism 10 is disposed in the accommodating cavity 21, one end of the adjustable strap 30 is in transmission connection with the tightness adjustment mechanism 10, free ends of the adjustable strap 30 respectively extend from the first limiting opening 24a and the second limiting opening 24b to fixedly connect to the VR glasses.

In some embodiments, the main housing body 20 includes a first housing 25 and a second housing 26, the first housing 25 and the second housing 26 enclose to form the accommodating cavity 21, and the first limiting opening 24a and the second limiting opening 24b are defined on the first housing 25. Specifically, the first housing 25 includes an accommodating groove having an opening, the second housing 26 covers the opening of the accommodating groove to form the accommodating cavity 21.

The first housing 25 and the second housing 26 are fixedly connected in one or more of a threaded manner, a snap-fit manner, and an adhesive manner. The first housing 25 and the second housing 26 are formed by injection molding, so that a processing thereof is simple and a complex shape is further formed, materials of the first housing 25 and the second housing 26 are, for example, but not limited to, polyethylene (PE), polypropylene (PP), polyvinyl chloride (PVC), polystyrene (PS), polycarbonate (PC), polyamide (PA), and polyester (PET).

The rear pillow assembly 40 includes at least one mounting component 41 and at least one connecting block 42, the at least one mounting component 41 is connected to the at least one connecting block 42, a positioning portion 421 is disposed on the at least one connecting block 42. Specifically, the at least one mounting component 41 are integrally formed using the PE, the PP, the PVC, the PS, the PC, etc.

In some embodiments, please refer to FIGS. 3-7, the main housing body 20 includes at least two limiting portions 281 disposed at intervals in a height direction thereof. Specifically, the at least two limiting portions 281 are disposed on an end surface of one side of the second housing 281 facing the VR glasses. The positioning portion 421 disposed on the at least one connecting block 42 is capable of respectively matching and fixing with each of the at least two limiting portions 281, so as to adjust a height of the strap assembly 1 with respect to the rear pillow assembly 40. Since the two free ends of the strap assembly 1 are fixedly connected to the VR glasses, the height of the strap assembly 1 of the present disclosure is adjusted with respect to the rear pillow assembly 40, that is, the VR glasses are capable of adjusting a wearing position with respect to the rear pillow assembly 40, in this way, the VR glasses better fit the head structure of the user through adjusting the height of the strap assembly 1 with respect to the rear pillow assembly 40, so that the pressure and the discomfort on the head of the user are reduced, thereby improving the wearing comfort of the VR glasses. Therefore, the user is enabled to enjoy virtual reality experience for a longer time without discomfort, and the user may adjust the wearing position of the VR glasses according to actual needs and comfort experience, so as to obtain a more personalized wearing experience.

In one embodiment, the positioning portion 421 and a corresponding one of the at least two limiting portions 281 are connected in the snap-fit manner, that is, one of the positioning portion 421 and the corresponding one of the at least two limiting portions 281 is a fastener, and the other one of the positioning portion 421 and the corresponding one of the at least two limiting portions 281 is a clamping groove, the fastener is fixedly connected to the clamping groove, so that the positioning portion 241 is matched and fixed with the corresponding one of the at least two limiting portions 281. In one embodiment, the positioning portion 421 and the at least two limiting portions 281 are fixing holes, a threaded fastener passes through the positioning portion 421 and the at least two limiting portions 281 to fix the positioning portion 421 and a corresponding one of the at least two limiting portions 281. Herein, specific forms of the positioning portion 421 and the at least two limiting portions 281 is not limited in the present disclosure.

In other embodiments of the present disclosure, a plurality of connecting blocks 42 and a plurality of positioning portions 421 are provided, the at least two limiting portions 281 are capable of being respectively matched and fixed with each of the plurality of the positioning portions 421 to adjust the height of the strap assembly 1 with respect to the rear pillow assembly 40. Therefore, any solutions matching and fixing the at least two limiting portions 281 and the positioning portion to adjust the height of the strap assembly 1 with respect to the rear pillow assembly 40 are within a protection scope of the present disclosure.

In order to facilitate the positioning portion 421 to respectively match and fix the at least two limiting portion 281 at different heights, please refer to FIGS. 3-7, an outer surface of the main housing body 20 is recessed toward the accommodating cavity 21 to form at least one sliding groove 28, the at least two limiting portions 281 are disposed on a bottom wall of the at least one sliding groove 28. The at least one connecting block 42 is slidably disposed in the at least one sliding groove 28, the positioning portion 421 is disposed at one end of the at least one connecting block 42 away from the at least one mounting component 41. When using the VR strap system 1000, the at least one connecting block 42 slides along the at least one sliding groove 28, the user matches the positioning portion 421 respectively with the at least two limiting portions 281 using a simple gesture, so that adjustment of the VR strap system 1000 is more flexible and convenient and usability of the VR strap system 1000 is improved. Moreover, when the at least one connecting block 42 slides in the at least one sliding groove 28, a sliding track thereof is kept stable, so that the positioning portion 421 is ensured to be accurately and respectively matched and fixed with the at least two limiting portions 281 at different heights, thereby improving stability and reliability of the adjustment of the VR strap system 1000.

Figure 7:
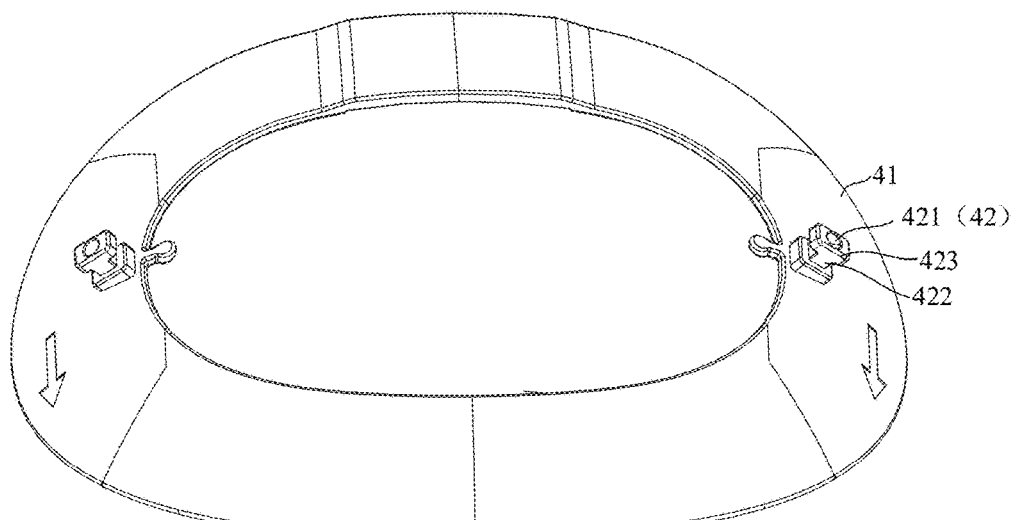
FIG. 7 is a structural schematic diagram of a mounting component and a connecting block according to one embodiment of the present disclosure.

Furthermore, please refer to FIG. 7, the at least one connecting block 42 includes a connecting section 422 and a limiting section 423, the connecting section 422 is perpendicular to the limiting section 423, the at least one mounting component 41 is disposed at one end of the connecting section 422 away from the limiting section 423, and the at least one positioning portion 421 is disposed on an end surface of the limiting section 423 away from the connecting section 422.

Along the height direction, the at least one sliding groove 28 includes fixing portions 282 disposed at two sides thereof, the fixing portions 282 extend toward a middle of the at least one sliding groove 28 to form a sliding space; in an extending direction of the main housing body 20, a size of the sliding space is not larger than a size of the limiting section 423 and not smaller than a size of the connecting section 422. When the sliding section 422 slides in the sliding space, the limiting section 423 is disposed within the at least one sliding groove 28 and abuts against an inner side surface of each of the fixing portions 282.

Specifically, in the embodiments of the present disclosure, the at least one connecting block 42 accurately slide along the height direction in the sliding groove 28, and the limiting section 423 accurately abuts against the inner side surface of each of the fixing portions 282, so that the positioning portion 421 is ensured to be accurately and respectively matched and fixed with the at least two limiting portions 281, thereby improving positioning precision when adjusting. At the same time, a contact between the limiting section 423 and the fixing portions 282 increases the stability of the at least one connecting block 42 in a sliding process, thereby preventing the at least one connecting block 42 from loosening or falling during use and improving stability and reliability of an overall structure.

It should be noted that, in some embodiments, the at least two limiting portions 281 are disposed on a groove side wall of the sliding groove 28, or the inner side surfaces of the fixing portions 282, and the positioning portion 421 is disposed at a position corresponding to the limiting section 423. Herein, specific positions of the at least two limiting portions 281 and the positioning portion 421 are not limited in the present disclosure.

In some embodiments, the at least two limiting portions 281 are dot protrusions, the positioning portion 421 is a dot groove, and each of the dot protrusions and the dot groove are in close contact. Such design achieves point-to-point contact, so that the at least one connecting block 42 is more accurately positioned, and the at least one connecting block 42 is effectively prevented from deviating or loosening during adjustment. The dot protrusions and the dot groove effectively reduce friction between the at least one connecting block 42 and the main housing body 20, thereby reducing a wear degree of components, and prolonging a service life of the components. In addition, shapes of the dot protrusions and the dot grooves also help to disperse stress, reduce local pressure concentration, and further enhance durability of the at least one connecting block 42.

Furthermore, a mounting port communicated with the sliding space is defined on one end of the at least one sliding groove 28; in the extending direction of the main housing body 20, a side of the mounting port is not smaller than the size of the connecting section 423. Specifically, during assembly, the limiting section 423 extends into the at least one sliding groove 28 from the mounting opening and slides the connecting section 422 to the sliding space, and the limiting section 423 abuts against the fixing portions 282, so that the at least one connecting block 42 is prevented from separating from the at least one sliding groove 28.

In order to improve stability of the positioning portion 421 and the at least two limiting portions 281 during adjustment, two limiting holes 283 are defined on the bottom wall of the at least one sliding groove 28 at intervals in the extending direction of the main housing body 20, and a supporting portion 284 is disposed on the bottom wall of the at least one sliding groove 28. The at least two limiting portions 281 are disposed on the supporting portion 284. Since the two limiting holes 283 are provided, the supporting portion 284 has a certain elasticity when being subjected to an external force, and then deforms within a certain range. In this way, adaptability of the at least one connecting block 42 in the sliding process is improved, clamping and fixing between the at least two limiting portions 281 and the positioning portion 421 are facilitated, moreover, when the at least two limiting portions 281 and the positioning portion 42 need to be adjusted, the at least two limiting portions 281 and the positioning portion 42 are capable of separating.

In order to improve comfort of wearing the VR glasses by the user, please refer FIGS. 8-9, in the embodiments of the present disclosure, the VR strap system 1000 further includes a rear pillow cushion 43, the rear pillow cushion 43 is connected to the at least one mounting component 41 and is configured to be in contact with a rear portion of a human head, so as to effectively reduce pressure of the VR strap system 1000 applying on a head of a human body. The rear pillow cushion 43 40 disperses the pressure of the VR strap system 1000 applying on the head of the human body to a larger area, thereby greatly avoiding the pressure from being concentrated at one point and further reducing discomfort and pain to the head of the human body. Through reducing the pressure applying on the head of the human body, the rear pillow cushion 43 further improves the stability of the VR apparatus, which is particularly important when the VR apparatus is used for a long time or used with strenuous exercise, the VR apparatus is effectively prevented from shaking or sliding during use, so that better immersion and viewing experience are further provided to the user. The rear pillow cushion 43 is selected from a soft sponge, a polyurethane memory cotton, a gel filler, etc., which is not limited in the present disclosure.

Manners for connecting the ear pillow cushion 43 and the mounting component 41 includes, but is not limited to, screwing manner, clamping manner, welding manner, and bonding manner.

Furthermore, in the embodiments of the present disclosure, the VR strap system 1000 further includes a pillow strap 50, and the pillow strap 50 is connected to the main housing body 20, or is connected to the at least one mounting component 41, which is not limited in the present disclosure. The pillow strap 50 is configured to in contact with a top portion of the human head. The pillow strap 50 provides additional support and stability to firmly fix the VR apparatus on the head of the user, which prevents the VR apparatus from shaking or sliding during use, and ensures stability of the VR apparatus, thereby improving the viewing experience of the user. The pillow strap 50 helps the user share a weight of the VR apparatus, thereby reducing pressure applying on a face of the user and providing a more comfortable wearing experience for the user. Through transferring partial weight of the VR apparatus to a top portion of the head of the user, burden on a neck and a shoulder of the user are reduced, allowing the user to have a more comfortable wearing experience when wearing the VR apparatus for a long time. A headrest cushion may be further provided on the pillow strap 50 to improve comfort of the VR apparatus. A specific form of the headrest cushion may be selected with reference to the specific form of the rear pillow cushion 43.

Please refer to FIG. 8, the main housing body 20 includes a connecting shaft 22 in the accommodating cavity 21. In some embodiments, the connecting shaft 22 is disposed on the second housing 26.

Please refer to FIG. 2, the adjustable strap 30 includes a first strap 31 and a second strap 32, a first part of first engaging teeth 33 is disposed at one end of the first strap 31, a second part of the first engaging teeth 33 is disposed at one end of the second strap 32, the first part of the first engaging teeth 33 are disposed opposite to the second part of the first engaging teeth 33. The one end of the first strap 31 and the one end of the second strap 32 where the first engaging teeth 33 are disposed are disposed in the accommodating cavity 21, a free end of the first strap 31 passes through the first limiting opening 24a, and a free end of the second strap 32 passes through the second limiting opening 24b.

In order to improve stability of the first strap 31 and the second strap 32 extending out of the main housing body 20, the main housing body 20 further includes a limiting rib (not shown in the drawings) in the accommodating cavity 21, and the limiting rib abuts against two sides of the adjustable strap 30. The limiting rib may be disposed on the first housing 25, or may also be disposed on the second housing 26. Specifically, the first strap 31 and the second strap 32 are also formed by injection molding, and a processing thereof is simple. In addition, materials of the first strap 31 and the second strap 32 may be selected with reference to the materials of the first housing 25 and the second housing 26 selected.

The tightness adjustment mechanism 10 is disposed in the accommodating cavity 21, and is configured to adjust a length of the free end of the first strap 31 extending from the first limiting opening 24a and a length of the free end of the second strap 32 extending from the second limiting opening 24b. Two opposite sides of the VR glasses are respectively connected to the free end of the first strap 31 and the free end of the second strap 32.

The tightness adjustment mechanism 10 is described below with reference to FIGS. 10-15, the tightness adjustment mechanism 10 includes a driving gear 100, an adjustment gear 200, a one-way clutch 300, and an adjustment knob 400.

Figure 12:
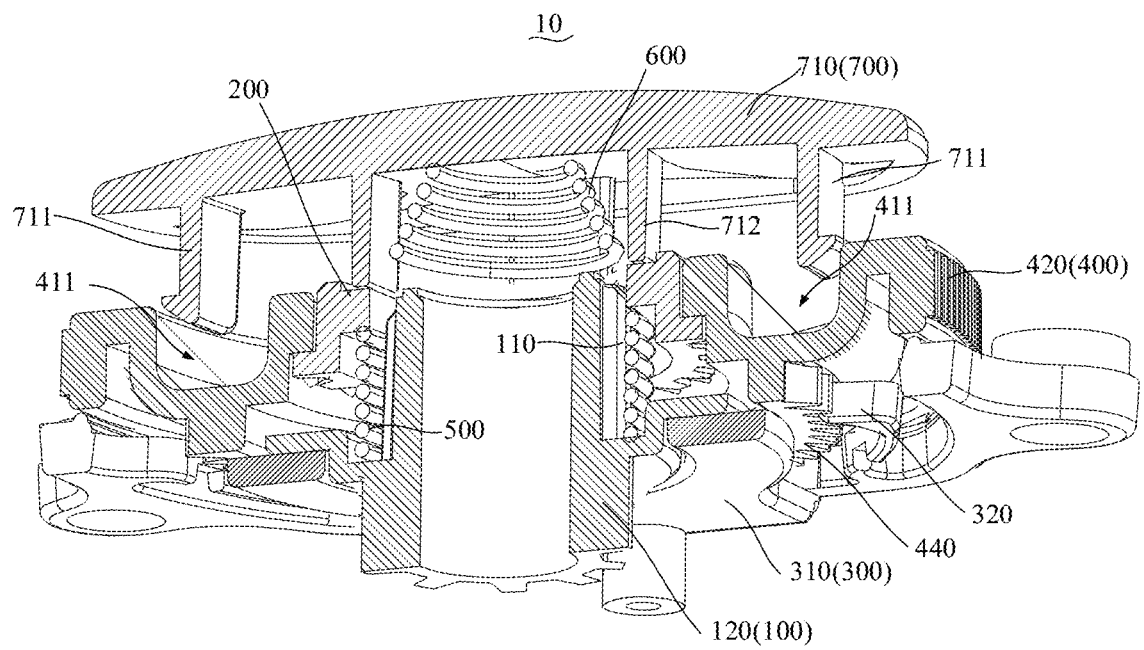
FIG. 12 is a cross-sectional schematic diagram of a tightness adjustment mechanism according to one embodiment of the present disclosure.

Please refer to FIGS. 10 and 12, the driving gear 100 is rotatably connected to the connecting shaft 22, the driving gear 100 includes a first driving portion 110 and second engaging teeth 120, the first driving portion 110 and the second engaging teeth 120 are disposed at intervals in a vertical direction, and the second engaging teeth 120 are engaged with the first engaging teeth 33. In some embodiments, the first part of the first engaging teeth 33 on the first strap 31 and the second part of the first engaging teeth 33 on the second strap 32 are respectively positioned on two sides of the second engaging teeth 120, so that all the first engaging teeth 33 on the first strap 31 and the second strap 32 are capable of being engaged with the second engaging teeth 120.

Figure 13:
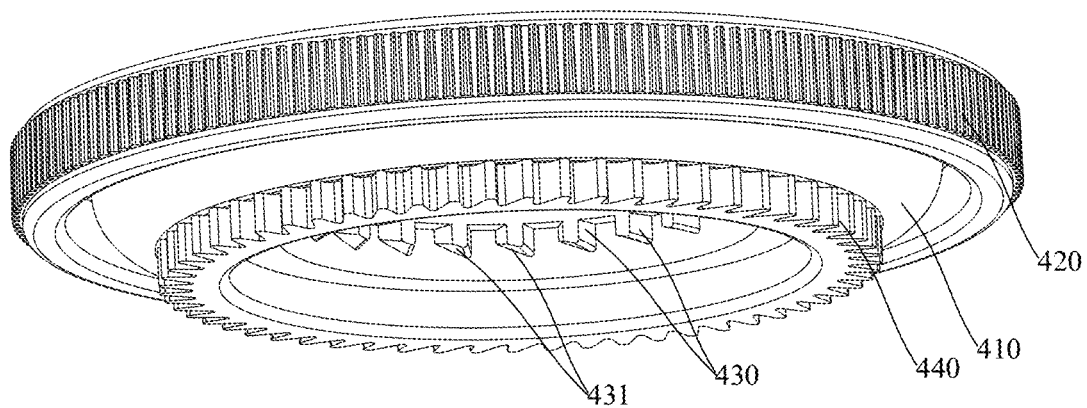
FIG. 13 is a structural schematic diagram of an adjustment knob according to one embodiment of the present disclosure.
Figure 14:
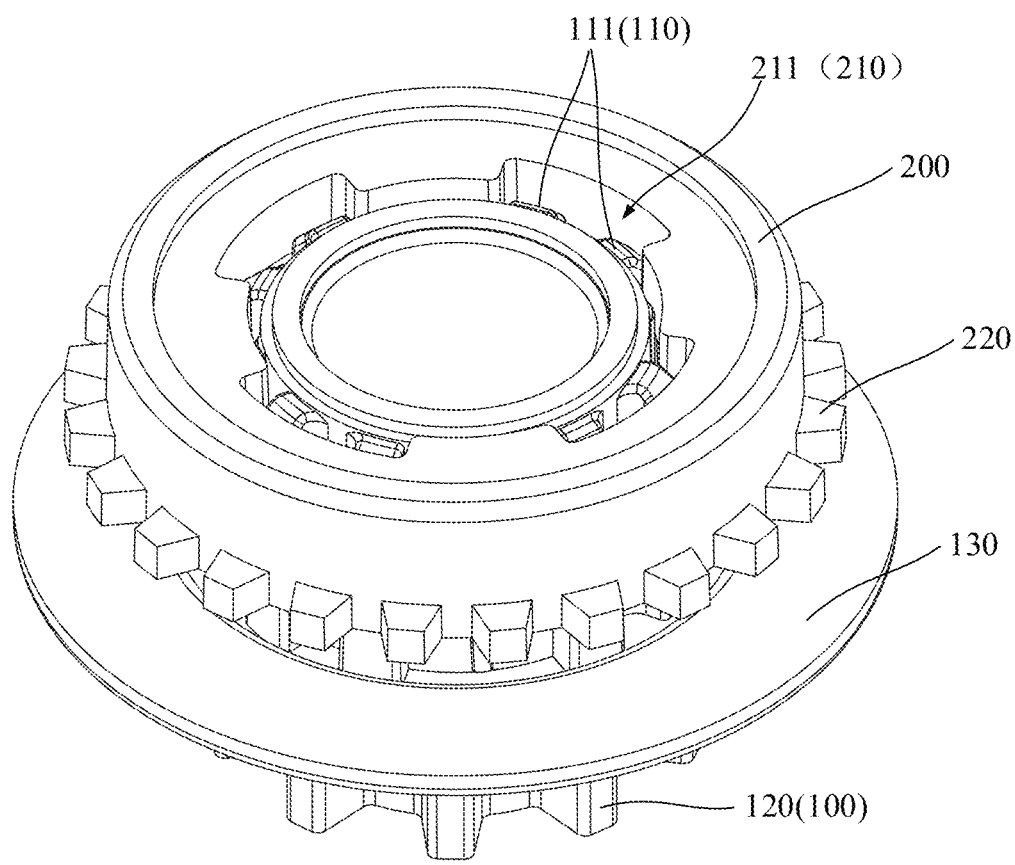
FIG. 14 is a structural schematic diagram of a driving gear assembling with an adjustment gear according to one embodiment of the present disclosure.

Please refer to FIGS. 13 and 14, the adjustment gear 200 is coaxially and rotatably connected to the driving gear 100, the adjustment gear 200 includes a first matching portion 210 and a second matching portion 220, the first matching portion 210 is connected to the second matching portion 220, the first matching portion 210 is in transmission connection with the first driving portion 100. In some embodiments, the adjustment gear 200 is sleeved on an outer side of the driving gear 100. The first driving portion 110 includes flanges 111 disposed on an outer wall surface of the driving gear 100, the first matching portion 210 includes notches 211 defined on an inner wall surface of the adjustment gear 200. In this way, the flanges 111 are clamped to the notches 211, so that the adjustment gear 200 is coaxially in transmission connection with the driving gear 100. Moreover, since contact areas between corresponding flanges 111 and corresponding notches 211 are large and the corresponding flanges 111 and the corresponding notches 211 are in close contact, the flanges 111 and the notches 211 have high stability and firmness, and loosening and friction between which are not easily generated. Two of the flanges 111 are matched with one of the notches 211. Therefore, a large contact area and sealing performance are provided between the adjustment gear 200 and the driving gear 100, and a relatively large torque is transmitted. Alternatively, the first driving portion 110 and the first matching portion 210 may be in a form of gears that cooperate with each other; the first driving portion 110 may also be in a form of including the notches 211, and the first matching portion 210 may also be in a form of including the flanges 111, which is not limited in the present disclosure.

The adjustment gear 200 is slidably disposed in the vertical direction, and the adjustment gear 200 has a first working position and a second working position.

Figure 15:
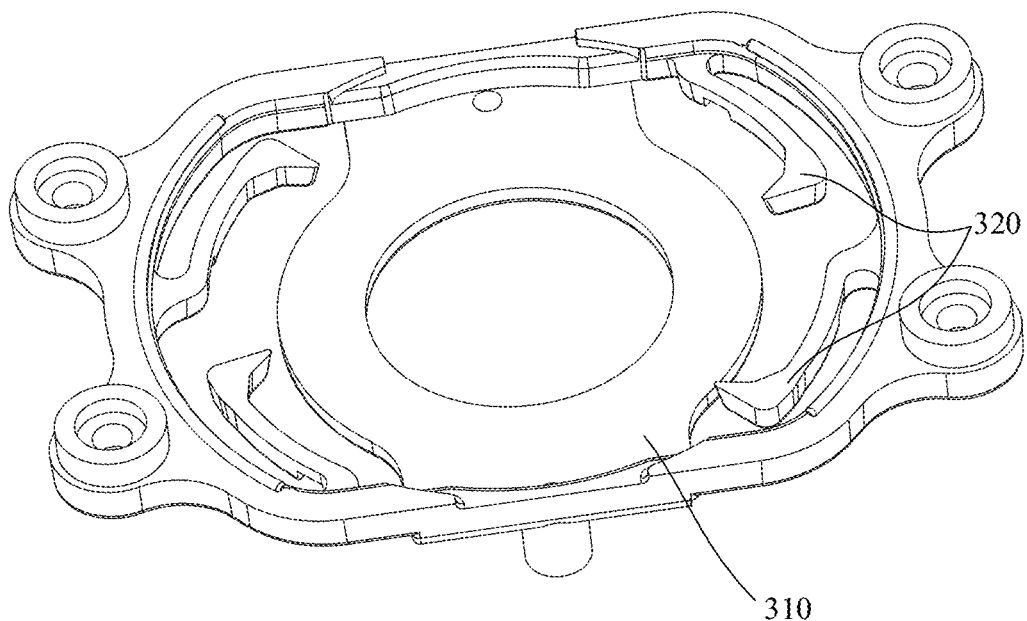
FIG. 15 is a structural schematic diagram of a one-way clutch according to one embodiment of the present disclosure.

Please refer to FIG. 15, the one-way clutch 300 is connected to the main housing body 20, and at least one pawl 320 is disposed on the one-way clutch 300. The one-way clutch 300 includes a main body portion 310, the main body portion 310 is annularly disposed on an outer side of the driving gear 100, at least one deformation gap is defined between the at least one pawl 320 and the main body portion 310. There are one or more manners for connecting the main body portion 310 and the main housing body 20, including screwing manner, clamping manner, welding manner, and bonding manner. As exemplarily shown in FIG. 15, the main body portion 310 includes at least one first fixing hole and at least one first threaded column, the first housing 25 includes at least one second fixing hole and at least one second threaded column for matching with the at least one first fixing hole and the at least one first threaded column, and the second housing 26 includes at least one third fixing hole and at least one third threaded column for matching with the at least one first fixing hole and the at least one first threaded column, so that the one-way clutch 300 is more stably assembled on the main housing body 20.

Please refer to FIG. 13, the adjustment knob 400 includes a mounting portion 410 and a knob portion 420, the knob portion 420 is connected to an outer side of the mounting portion 410. The mounting portion 410 is coaxially and rotatably connected to the adjustment gear 200, the mounting portion 410 includes a second driving portion 430 in transmission connection with the second matching portion 220. The adjustment knob 400 is disposed on an upper portion of the adjustment gear 200. In some embodiments, the second matching portion 220 is a first limiting gear disposed on an outer wall surface of the adjustment gear 200, the second driving portion 430 is a second limiting gear disposed on an inner wall surface of the mounting portion 410. The first limiting gear is matched with the second limiting gear, so that the adjustment knob 400 is coaxially and rotatably connected to the adjustment gear 200. When rotating the adjustment knob 400, the adjustment knob 400 drives the adjustment gear 200 to rotate.

A guide portion 431 is disposed at a bottom end of the first limiting gear and/or a top end of the second limiting gear. As exemplarily shown in FIG. 13, the guide portion 431 is disposed at a bottom end of the second limiting gear, in this way, even though the first limiting gear and the second limiting gear are not aligned, the first limiting gear and the second limiting gear may also be next aligned and arranged through a guiding effect of the guide portion 431, thereby improving clamping efficiency of the first limiting gear and the second limiting gear, avoiding the first limiting gear and the second limiting gear from rigid collision therebetween to affect service lives thereof.

Please refer to FIG. 12, the mounting portion 410 further includes ratchet teeth 440 engaged with the at least one pawl 320. The knob portion 420 partially extends out of the main housing body 20 for the user to rotate. It can be understood that, in order to improve a friction force of the knob portion 420 when the knob portion 420 is rotated, a plurality of protrusions are disposed on an outer surface of the knob portion 420. The ratchet teeth 440 are configured to control a rotation direction of the adjustment knob 400, that is, the adjustment knob 400 rotates only in a first direction. Specifically, when the adjustment knob 400 rotates in the first direction, the adjustable strap 30 retracts into the accommodation cavity 21. In this way, when the VR strap system 1000 is worn on the head of the user, the adjustable strap 30 is pushed by adjusting the adjustment knob 400 for tightening, so that the VR glasses are firmly fixed to the head of the user, and a stable and comfortable wearing experience is provided for the user.

When the adjustment gear 200 is in the first working position, the second matching portion 220 is matched and connected with the second driving portion 430. When the adjustment gear 200 is in the second working position, the second matching portion 220 is separated from the second driving portion 430 and is out of limitation of the second driving portion 430.

When assembling the VR strap system 1000 of the present disclosure, the one-way clutch 300 is firstly assembled on the second housing 26, the driving gear 100 is assembled on the connecting shaft 22, then the first elastic component 500 is sleeved on an outer side of the first driving portion 110, then the adjustment gear 200 is sleeved on the outer side of the first driving portion 110 and abuts against the first elastic component 500, then the adjustment knob 400 is assembled on the second housing 26, and the second housing 26 is connected to the first housing 25 in the snap-fit manner, so that the tightness adjustment mechanism 10 is assembled in the accommodating cavity 21.

According to the tightness adjustment mechanism 10 of the embodiments of the present disclosure, when the adjustment gear 200 is in the first working position, the second matching portion 220 is matched and connected with the second driving portion 430, at this time, if the knob portion 420 is rotated, the adjustment gear 200 receives a transmission force from the second driving portion 430 through the second matching portion 220, the driving gear 100 is then drive to rotate, and the driving gear 100 drives the first strap 31 and the second strap 32 to retract into the accommodating cavity 21, so as to tighten the adjustable strap 30. However, when the adjustment gear 200 is in the second working position, the second matching portion 220 is on longer limited by the second driving portion 430, so that the adjustment gear 200 is capable of freely rotating and is not interfered by the second driving portion 430, at this time, the user may directly pull the adjustable strap 30 out of the accommodating cavity 31, or push the adjustable strap 30 into the accommodating cavity 21, so as to quickly loosen or tighten the VR strap system 1000. Therefore, according to the embodiments of the present disclosure, when the adjustment gear 200 is in the first working position, the adjustment knob 400 is provided to fine-tune the adjustable strap 30, so that the adjustable strap 30 is capable of being adjusted to a wearing state which provides a comfortable wearing experience of the user; when the adjustment gear 200 is in the second working position, the adjustable strap 30 is further capable of being quickly loosen or tighten to improve operation efficiency of the user, thereby saving time for adjustment.

Based on above, the embodiments of the present disclosure further provide the tightness adjustment mechanism 10 to adjust a length of the adjustable strap 30 according to a head size and preference of the user to achieve personalized adaptation, so as to ensure the VR glasses to keep in a stable position and better fit the head of the user during a wearing process. Therefore, through adjusting the length of the adjustable strap 30, the VR glasses are effectively prevented from shaking or sliding during use, a better visual experience is provided for the user, and the user may also obtain a more comfortable and stable wearing experience.

The adjustment gear 200 is slidably disposed in the vertical direction and has have various forms when switching between the first working position and the second working position, details of which is as follows.

Please refer to FIGS. 10 and 12, in some embodiments, a bearing portion 130 protrudes outward from a middle of the driving gear 100, the bearing portion 130 is disposed between the first driving portion 110 and the second engaging teeth 120. The tightness adjustment mechanism 10 further includes a first elastic component 500, two ends of the first elastic component 500 respectively abut against the bearing portion 130 and the adjustment gear 200. The first elastic component 500 is selected from a spring, pressure spring, a torsion spring, etc., which is not limited in the present disclosure. Specifically, in a natural extension state of the first elastic component 500, the adjustment gear 200 is subjected to an elastic force, so that the second matching portion 220 and the second driving portion 430 are matched and connected, and if the adjustment gear 200 is subjected to a downward pressing force, the first elastic component 500 is compressed, so that the adjustment gear 200 slides downward to be out of limitation of the second driving portion 430.

In order to improve stability of the first elastic component 500 when abutting, a groove 131 is defined on the bearing portion 130, one end of the first elastic component 500 abuts against a groove bottom wall and a groove side wall of the groove 131. In some embodiments, the bearing portion 130 is overlapped on the main body portion 310. In this way, when the first elastic component 500 applies an elastic force to the bearing portion 130, the bearing portion 130 still keeps good stability.

In order to facilitate applying a downward sliding pressure to the adjustment gear 200, please further refer to FIGS. 10 and 12, the VR strap system 1000 further includes a button 700 and a second elastic component 600. The button 700 is connected to the main housing body 20 in the snap-fit manner, and the button 700 partially extends out of the main housing body 20. The button 700 includes a pressing portion 710, at least one hook 711, and at least one pressing block 712. The at least one hook 711 and the at least one pressing block 712 are disposed on one side of the pressing portion 710 facing the second elastic component 600. At least one through hole 23a is defined on the main housing body 20, at least one clamping hole 23b for matching with the at least one hook 711 is further defined on the main housing body 20, the at least one pressing block 712 passes through the at least one through hole 23a. As exemplarily shown in FIG. 10, the first housing 25 defines the at least one through hole 23a and the at least one clamping hole 23b, and it can be understood that in order to improve stability of the at least one pressing block 712 when the adjustment gear 200 is pressed, a plurality of pressing blocks 712 are provided, and the plurality of the pressing blocks 712 are symmetrically disposed taking an axis of the connecting shaft 712 s a symmetric axis. The mounting portion 410 includes at least one limiting groove 411 matching with the at least one hook 711. When the button 700 slides in the vertical direction, the at least one hook 711 is at least partially positioned in the at least one limiting groove 411.

In some embodiments, a mounting groove 27 is recessed inward from an outer wall surface of the main housing body 20, the button 700 is partially disposed in the mounting groove 27, an outer surface of the button 700 and the outer wall surface of the main housing body 20 are in the same smooth transition surface. In this way, scraping or squeezing caused by edges or corners on skins of the user are reduced, thereby reducing a risk of skin injury. In addition, a connection between the button 700 and the main housing body 20 which is in the same smooth transition surface also make an appearance of the main housing body 20 smoother and more delicate.

Two ends of the second elastic component 600 respectively abut against the first housing 25 and the button 700. The button 700 is slidably disposed in the vertical direction, so that the adjustment gear 200 is switched between the first working position and the second working position. The second elastic component 600 is selected from a spring, a pressure spring, a torsion spring, etc., which is not limited in the present disclosure. An outer diameter of the second elastic component 600 is reduced in a direction away from the connecting shaft 22. That is, the second elastic component 600 is tapered, such that rigidity of the second elastic component 600 gradually changes with a degree of compression or stretching. When the second elastic component 600 is compressed or stretched to a greater extent, the rigidity of which also accordingly increases. Such gradually varied rigidity provides better load distribution and damping effect, so that a spring being tapered has better dynamic response and vibration damping capability in some applications.

Specifically, in a natural extension state of the second elastic component 600, the button 700 is subjected to an upward elastic force, and due to limitation of the at least one hook 711, the button 700 is connected to the first housing 25 in the snap-fit manner and may not separate with the first housing 25. When the user presses the button 700, when the button 700 is subjected to the downward pressing force, the second elastic component 600 is compressed and slides downward, so that the adjustment gear 200 is pressed down, and the second matching portion 220 is out of limitation of the second driving portion 430. In this way, the tightness adjustment mechanism 10 is capable of quickly adjusting the adjustable strap 30 and also fine-tuning the adjustable strap 30. The connection manners provided in the embodiments of the present disclosure are simple, stable in transmission, low in cost, light in weight, and relatively small in burden when the VR glasses worn by the user.

Certainly, in some embodiments, the adjustment gear 200 is driven to slide in the vertical direction through a driving device, for example, a motor includes a gear at an output end thereof, a transmission rod disposed in the vertical direction is engaged on the gear, and the transmission rod drives the adjustment gear 200 to move in the up-down direction. In this way, the button 700 and elastic components are not required, and tightness adjustment is achieved by controlling a rotation direction of the motor. Herein, a specific manner of switching the adjustment gear 200 in the first working position and the second working position is not limited in the present disclosure.

Same or similar reference numerals in the drawings of the embodiments of the present disclosure correspond to the same or similar components. In the description of the present disclosure, it should be understood that orientations or working position relationships indicated by terms "upper", "lower", "left", "right", etc. are only for ease of description of the present disclosure and simplified description, rather than indicating or implying that the referred device or element must have a specific orientation, and is constructed and operated in a specific orientation, so the terms describing the working position relationships in the accompanying drawings are only used for exemplary description and cannot be understood as a limitation to the present disclosure, and for those who skilled in the art, specific meanings of above terms may be understood according to specific situations.

The above are only preferred embodiments of the present disclosure and are not intended to limit the present disclosure, and any modification, equivalent replacement and improvement made within a spirit and a principle of the present disclosure shall fall within a protection scope of the present disclosure.

What is claimed is:

1. A virtual reality (VR) strap system, comprising:
a strap assembly; and
a rear pillow assembly;
wherein the strap assembly is configured to connect to VR glasses, the strap assembly comprises a main housing body, and the main housing body comprises at least two limiting portions disposed at intervals in a height direction thereof;
the rear pillow assembly is configured to be in contact with a rear portion of a human head, the rear pillow assembly comprises at least one mounting component and at least one connecting block, the at least one mounting component is connected to the at least one connecting block, a positioning portion is disposed on the at least one connecting block;
the positioning portion is capable of respectively matching and fixing with each of the at least two limiting portions, so as to adjust a height of the strap assembly with respect to the rear pillow assembly;
an accommodating cavity is defined in the main housing body, an outer surface of the main housing body is recessed toward the accommodating cavity to form at least one sliding groove, the at least two limiting portions are disposed on a bottom wall of the at least one sliding groove;
the at least one connecting block is slidably disposed in the at least one sliding groove, the positioning portion is disposed at one end of the at least one connecting block away from the at least one mounting component;
the at least one connecting block comprises a connecting section and a limiting section, the connecting section is perpendicular to the limiting section, the at least one mounting component is disposed at one end of the connecting section away from the limiting section, and the at least one positioning portion is disposed on an end surface of the limiting section away from the connecting section;
along the height direction, the at least one sliding groove comprises fixing portions disposed at two sides thereof, the fixing portions extend toward a middle of the at least one sliding groove to form a sliding space; and
in an extending direction of the main housing body, a size of the sliding space is not larger than a size of the limiting section and not smaller than a size of the connecting section; when the sliding section slides in the sliding space, the limiting section is disposed within the at least one sliding groove and abuts against an inner side surface of each of the fixing portions.

2. The VR strap system according to claim 1, wherein a mounting port communicated with the sliding space is defined on one end of the at least one sliding groove; and
in the extending direction of the main housing body, a side of the mounting port is not smaller than the size of the limiting section.

3. The VR strap system according to claim 1, wherein two limiting holes are defined on the bottom wall of the at least one sliding groove at intervals in the extending direction of the main housing body, and a supporting portion is disposed on the bottom wall of the at least one sliding groove; and
the at least two limiting portions are disposed on the supporting portion.

4. The VR strap system according to claim 1, wherein the rear pillow assembly further comprises a rear pillow cushion, the rear pillow cushion is connected to the mounting component and is configured to be in contact with the rear portion of the human head; and/or
the VR strap system further comprises a pillow strap, the pillow strap is connected to the rear pillow assembly and is configured to be in contact with a top portion of the human head.

5. A VR apparatus, comprising;
VR glasses; and
the VR strap system according to claim 1;
wherein two opposite sides of the VR glasses are respectively connected to two free ends of the strap assembly.

6. A VR strap system, comprising:
a strap assembly; and
a rear pillow assembly;
wherein the strap assembly is configured to connect to VR glasses, the strap assembly comprises a main housing body, and the main housing body comprises at least two limiting portions disposed at intervals in a height direction thereof;
the rear pillow assembly is configured to be in contact with a rear portion of a human head, the rear pillow assembly comprises at least one mounting component and at least one connecting block, the at least one mounting component is connected to the at least one connecting block, a positioning portion is disposed on the at least one connecting block;
the positioning portion is capable of respectively matching and fixing with each of the at least two limiting portions, so as to adjust a height of the strap assembly with respect to the rear pillow assembly;
an accommodating cavity is defined in the main housing body, an outer surface of the main housing body is recessed toward the accommodating cavity to form at least one sliding groove, the at least two limiting portions are disposed on a bottom wall of the at least one sliding groove;
the at least one connecting block is slidably disposed in the at least one sliding groove, the positioning portion is disposed at one end of the at least one connecting block away from the at least one mounting component;

wherein the main housing body comprises a connecting shaft in the accommodating cavity;
the strap assembly comprises:
an adjustable strap; and
a tightness adjustment mechanism;
wherein first engaging teeth are disposed on one end of the adjustable strap, and a free end of the adjustable strap extends out of one end of the main housing body; the tightness adjustment mechanism is disposed in the accommodating cavity;
wherein the tightness adjustment mechanism comprises:
a driving gear;
an adjustment gear;
a one-way clutch; and
an adjustment knob;
wherein the driving gear is rotatably connected to the connecting shaft, the driving gear comprises a first driving portion and second engaging teeth, the first driving portion and the second engaging teeth are disposed at intervals in a vertical direction, and the second engaging teeth are engaged with the first engaging teeth;
the adjustment gear is coaxially and rotatably connected to the driving gear, the adjustment gear comprises a first matching portion and a second matching portion, the first matching portion is connected to the second matching portion, the first matching portion is in transmission connection with the first driving portion; the adjustment gear is slidably disposed in the vertical direction, and the adjustment gear has a first working position and a second working position;
the one-way clutch is connected to the main housing body, and at least one pawl is disposed on the one-way clutch;
the adjustment knob comprises a mounting portion and a knob portion, the knob portion is connected to an outer side of the mounting portion; the mounting portion is coaxially and rotatably connected to the adjustment gear, the mounting portion comprises a second driving portion in transmission connection with the second matching portion, the mounting portion further comprises ratchet teeth engaged with the at least one pawl; the knob portion partially extends out of the main housing body; and
when the adjustment gear is in the first working position, the second matching portion is matched and connected with the second driving portion; when the adjustment gear is in the second working position, the second matching portion is separated from the second driving portion and is out of limitation of the second driving portion.

7. The VR strap system according to claim 6, wherein a bearing portion protrudes outward from a middle of the driving gear, the bearing portion is disposed between the first driving portion and the second engaging teeth; and
the tightness adjustment mechanism further comprises a first elastic component, two ends of the first elastic component respectively abut against the bearing portion and the adjustment gear.

8. The VR strap system according to claim 7, wherein a groove is defined on the bearing portion, one end of the first elastic component abuts against a groove bottom wall and a groove side wall of the groove.

9. The VR strap system according to claim 7, further comprising:
a button; and
a second elastic component;
wherein the button is connected to the main housing body in a snap-fit manner, and the button partially extends out of the main housing body; two ends of the second elastic component respectively abut against the main housing body and the button; the button is slidably disposed in the vertical direction, so that the adjustment gear is switched between the first working position and the second working position.

10. The VR strap system according to claim 9, wherein the button comprises a pressing portion, at least one hook, and at least one pressing block; the at least one hook and the at least one pressing block are disposed on one side of the pressing portion facing the second elastic component; at least one through hole is defined on the main housing body, at least one clamping hole for matching with the at least one hook is further defined on the main housing body, the at least one pressing block passes through the at least one through hole.

11. The VR strap system according to claim 10, wherein the mounting portion comprises at least one limiting groove matching with the at least one hook; when the button slides in the vertical direction, the at least one hook is at least partially positioned in the at least one limiting groove.

12. The VR strap system according to claim 9, wherein a mounting groove is recessed inward from an outer wall surface of the main housing body, the button is partially disposed in the mounting groove, an outer surface of the button and the outer wall surface of the main housing body are in the same smooth transition surface.

13. The VR strap system according to claim 7, wherein the one-way clutch comprises a main body portion, the main body portion is annularly disposed on an outer side of the driving gear, at least one deformation gap is defined between the at least one pawl and the main body portion, and the bearing portion is overlapped on the main body portion.

14. The VR strap system according to claim 6, wherein the first driving portion comprises flanges disposed on an outer wall surface of the driving gear.

15. The VR strap system according to claim 14, wherein the adjustment gear is annularly disposed on an outer side of the driving gear, the first matching portion comprises notches defined on an inner wall surface of the adjustment gear.

16. The VR strap system according to claim 6, wherein the second matching portion is a first limiting gear disposed on an outer wall surface of the adjustment gear, the second driving portion is a second limiting gear disposed on an inner wall surface of the mounting portion, the first limiting gear is clamped with the second limiting gear.

17. The VR strap system according to claim 16, wherein a guide portion is disposed at a bottom end of the first limiting gear and/or a top end of the second limiting gear.

* * * * *